United States Patent
Acke et al.

(10) Patent No.: US 7,621,121 B2
(45) Date of Patent: Nov. 24, 2009

(54) METHOD AND ARRANGEMENT FOR PURIFYING EXHAUST GAS IN AN INTERNAL COMBUSTION ENGINE

(75) Inventors: Filip Acke, Göteborg (SE); Roger Tengblad, Göteborg (SE); John Korsgren, Hisings Karra (SE); Maria Karlsson, Göteborg (SE)

(73) Assignee: Ford Global Technologies, LLC, Dearborn, MI (US)

( * ) Notice: Subject to any disclaimer, the term of this patent is extended or adjusted under 35 U.S.C. 154(b) by 86 days.

(21) Appl. No.: 11/459,103

(22) Filed: Jul. 21, 2006

(65) Prior Publication Data
US 2007/0101701 A1    May 10, 2007

(30) Foreign Application Priority Data
Jul. 21, 2005    (EP)    ................... 05106693

(51) Int. Cl.
*F01N 3/00*    (2006.01)
(52) U.S. Cl. .............. 60/285; 60/274; 60/295; 60/297
(58) Field of Classification Search ............ 60/285, 60/286, 295, 297, 311, 274
See application file for complete search history.

(56) References Cited
U.S. PATENT DOCUMENTS

| | | | | |
|---|---|---|---|---|
| 6,021,639 A | * | 2/2000 | Abe et al. ................ | 60/297 |
| 6,530,216 B2 | * | 3/2003 | Pott ........................ | 60/295 |
| 6,820,418 B2 | * | 11/2004 | Nakatani et al. ........ | 60/297 |
| 6,938,411 B2 | * | 9/2005 | Hoffmann et al. ...... | 60/295 |
| 6,962,045 B2 | * | 11/2005 | Kitahara et al. ........ | 60/295 |
| 7,062,907 B2 | * | 6/2006 | Kitahara ................. | 60/295 |
| 7,197,867 B2 | * | 4/2007 | Huang et al. ........... | 60/295 |
| 7,207,171 B2 | * | 4/2007 | Nagaoka et al. ........ | 60/295 |
| 7,334,398 B2 | * | 2/2008 | Kitahara ................. | 60/285 |
| 2003/0113249 A1 | * | 6/2003 | Hepburn et al. ....... | 423/242.1 |
| 2004/0123590 A1 | * | 7/2004 | Tabata et al. ........... | 60/295 |
| 2004/0226284 A1 | * | 11/2004 | Kitahara et al. ........ | 60/285 |

* cited by examiner

*Primary Examiner*—Tu M Nguyen
(74) *Attorney, Agent, or Firm*—Julie Voutyras; Alleman Hall McCoy Russell & Tuttle LLP

(57) ABSTRACT

The invention relates to a method for purifying exhaust gas in an internal combustion engine provided with an LNT and a particulate matter filter arranged in an exhaust gas conduit of the engine. The method includes de-sulfurization of the LNT and regeneration of the particulate matter filter. The invention includes the following steps: initiating a heating phase wherein the engine is set to generate heat sufficient for the de-sulfurization and the regeneration; initiating a de-sulfurization phase during a first time period ($t_1$), in which the engine is set to generate a rich exhaust gas in the exhaust gas conduit; keeping the first time period below a first maximum value so as to avoid release of emissions of $H_2S$ from the engine; initiating a regeneration phase during a second time period, in which the engine is set to generate a lean exhaust gas in the exhaust gas conduit; keeping the second time period below a second maximum value so as to avoid thermal damage to the particulate matter filter; and repeating the de-sulfurization phase and the regeneration phase in a periodical manner.

16 Claims, 2 Drawing Sheets

METHOD AND ARRANGEMENT FOR PURIFYING EXHAUST GAS IN AN INTERNAL COMBUSTION ENGINE

FIELD OF THE INVENTION

The present invention relates to a method and a system for purifying exhaust gas in an internal combustion engine provided with a Lean $NO_x$ trap (LNT) and a particulate matter filter arranged in an exhaust gas conduit of said engine, and more particularly to de-sulfurisation of said LNT and regeneration of said particulate matter filter.

BACKGROUND OF THE INVENTION

In the field of vehicles which are operated by combustion engines, there is a general demand for low emissions of regulated substances in the exhaust gases from the engine. In the case of a diesel engine (CI engine), these substances are primarily in the form of nitrogen oxide compounds ($NO_x$), hydrocarbon compounds (HC), carbon monoxide (CO) and particulate matter.

Today's diesel engines can be operated with a relatively lean exhaust gas, i.e. with a relatively high concentration of oxygen. A lean exhaust gas is one which has an air/fuel ratio $\lambda$ which is higher than 1. A rich exhaust gas is one which has an air/fuel ratio $\lambda$ which is less than 1.

In contrast to a conventional gasoline engine (SI engine) which is equipped with a so-called three-way catalyst for removing the major part of the nitrogen oxide compounds ($NO_x$), hydrocarbon compounds (HC) and carbon monoxide (CO) from the exhaust gases, a modern diesel engine normally uses a particulate matter filter (also known as a "diesel particulate filter", or DPF) for trapping particulate matter in the exhaust gas. Such a filter is suitably also provided with an oxidizing catalyst for oxidizing, i.e. removing, hydrocarbon compounds (HC) and carbon monoxide (CO) in the exhaust gas. However, in order to remove nitrogen oxide compounds ($NO_x$) from the exhaust gas, a so-called lean LNT (or LNT) is normally used. In this regard, it is previously known to use an LNT and a particulate matter filter with a diesel engine, either as two separate units or as one single integrated unit.

In an LNT, the $NO_x$ compounds in the exhaust gas will be adsorbed by means of a $NO_x$ storing compound such as barium. It should be noted that the LNT can only adsorb a certain amount of $NO_x$ compounds. This means that it will eventually be "filled", i.e. it will reach a limit for the adsorption process. In this situation, the LNT must be regenerated, which means that it must be brought to desorb, i.e. release, the accumulated $NO_x$ compounds. Such a "denitration" process is normally carried out by making the exhaust gas mixture relatively rich, i.e. with a surplus of fuel compared to the amount of oxygen that is available for the combustion, during a certain time period. This can be achieved by means of the engine being operated with a comparatively rich air/fuel mixture during a short time period, e.g. a few seconds. In this manner, the LNT will be "emptied" so that it thereafter can adsorb $NO_x$ compounds during a certain time period which lasts until a new regeneration becomes necessary.

A particular problem with a LNT is that during operation, it will be exposed to sulfur which originates from the engine fuel or oil and is fed through the LNT via the exhaust gas. The sulfur in the exhaust gas results in poisoning of the LNT which causes ageing of the LNT and also reduces the number of available $NO_x$ storage sites in the LNT, so that the oxidation capacity of the LNT is reduced. Gradually, the LNT will be deteriorated until it reaches a stage where sulfur regeneration of the LNT (also known as "de-sulfurisation" or "deSOx") becomes necessary, in order to purge the LNT from adsorbed sulfur compounds.

In order to carry out a de-sulfurisation process, the engine is operated so as to provide a relatively rich exhaust gas mixture, i.e. having a surplus of fuel compared to the amount of oxygen that is available for the combustion, during a certain time period. Also, the de-sulfurisation process demands an increased exhaust gas temperature, more precisely an exhaust gas temperature which is at least approximately 600-650° C. This raised temperature is normally provided by means of so-called post-injections of fuel, i.e. injections of fuel during a late stage of the combustion procedure. Such post-injections generate a relatively high amount of heat, but only a relatively low amount of torque in the engine. By providing a rich exhaust gas mixture and an increased exhaust gas temperature during a certain time period, sulfur compounds will be emitted from the LNT.

The conversion efficiency of the LNT benefits from frequent de-sulfurisation actions, due to the fact that irreversible sulfur poisoning can be avoided in this way. In practical applications, the de-sulfurisation frequency is limited for fuel consumption reasons. In normal applications, de-sulfurisation of the LNT are carried out with an interval of approximately 1000-100000 km, depending mainly on the quality of the fuel being used, i.e. depending on the sulfur concentration in the fuel.

An unwanted side-effect of the de-sulfurisation process is that there is a risk for emissions of $H_2S$, if the time period with a rich exhaust gas mixture becomes too long. Emissions of $H_2S$ causes a bad smell from the exhaust gas. For this reason, said time period must be limited so as to avoid $H_2S$ emissions.

Furthermore, as regards the above-mentioned particulate matter filter, it can be noted that such a filter is used for the removal of soot particles in the exhaust flow. To avoid a high back pressure and excessively high temperatures during soot burnout, the particulate matter filter must be regenerated on a regular basis. Such a regeneration process demands a relatively high temperature, at least approximately 580° C. Also, this regeneration process requires a lean exhaust gas mixture to provide a surplus of oxygen, which in turn is necessary for the combustion of the accumulated particulate matter in the filter.

However, the regeneration of a particulate matter filter is sensitive to the oxygen content in the exhaust gas, since the combination of high soot loading and excess oxygen during regeneration may result in a very high temperature in the particulate matter filter. This may in turn cause irreversible damage to the particle filter, more precisely in the form of substrate cracking or melting.

Both the above-mentioned regeneration actions require high exhaust temperatures, which inevitably result in increased fuel consumption. Consequently, a general problem in the field of exhaust gas purification is to carry out the above-mentioned sulfur regeneration processes of a LNT and regeneration of a particulate matter filter in an optimum manner, without unnecessarily increasing the fuel consumption and without the above-mentioned problems and disadvantages.

Regarding prior art, it can be noted that the patent document US 2003/0213235 teaches an apparatus for purifying exhaust gas in an internal combustion engine. In particular, said document teaches a particulate filter and a $NO_x$ trap, wherein regeneration of the particulate filter, and $NO_x$ regeneration and de-sulfurisation of the $NO_x$ trap are carried out.

SUMMARY OF THE INVENTION

The present invention is directed to a method and a system for purifying exhaust gases from an internal combustion, by means of which the above-mentioned problems can be solved and wherein regeneration of a particulate filter and de-sulfurisation of the $NO_x$ trap can be carried out in an optimum manner.

According to the present invention, the method for purifying exhaust gas in an internal combustion engine having and LNT coupled downstream of it, and a particulate matter filter coupled downstream of the LNT, includes: Increasing engine exhaust temperature sufficient to de-sulphate the LNT and to regenerate the particulate matter filter when a predetermined operating condition is met; operating the engine rich for a first predetermined time period to de-sulphate the LNT; subsequently operating the engine lean for a second predetermined time period to regenerate the particulate matter filter; and repeating said de-sulphasion and regeneration in a periodic manner.

In another aspect of the present invention, a system for purifying exhaust gas in an internal combustion engine, includes: an LNT and a particulate matter filter arranged in series in an exhaust gas conduit of the engine; and a control unit for controlling the operation of the engine, wherein said control unit is arranged for initiating a heating phase wherein the engine is set to generate heat sufficient for said de-sulfurisation of said LNT and regeneration of said particulate matter filter, said control unit initiating an LNT de-sulphasion phase during a first time period, in which the engine is set to generate a rich exhaust gas in said exhaust gas conduit, wherein said first time period is kept below a first maximum value so as to avoid release of emissions of $H_2S$ from said engine, said control unit subsequently initiating a particulate matter filter regeneration phase during a second time period, in which the engine is set to generate a lean exhaust gas in said exhaust gas conduit, wherein said second time period is kept below a second maximum value to avoid thermal damage to said particulate matter filter; and repeating de-sulphasion phase and said regeneration phase in a periodical manner.

The present invention accomplished a number of advantages. For example, two events, i.e. a de-sulfurisation event and a regeneration event, are combined into one single process. This means that the sulfur poisoning of the LNT may be maintained at an acceptable level. Furthermore, the $NO_x$ conversion efficiency is maintained over time because the regeneration of the particulate matter filter will also de-sulfurise the LNT. Also, by combining these events, the fuel penalty for the entire regeneration process can be minimized.

Furthermore, the periodical switching between a rich and a lean exhaust gas mixture according to the invention results in an exotherm which raises the exhaust gas temperature. Since the soot oxidation rate in the particulate matter filter is exponential in relation to temperature, the time which is needed for a regeneration of the particulate matter filter is reduced. This also contributes to an improvement as regards the fuel consumption.

Generally, by means of the invention, drawbacks in the form of $H_2S$ formation in the LNT and a potential risk for damage to the particulate matter filter due to high temperatures can be avoided.

BRIEF DESCRIPTION OF DRAWINGS

In the following, the invention will be described with reference to the appended drawings, wherein.

DESCRIPTION OF A PREFERRED EMBODIMENT

Figure 1:
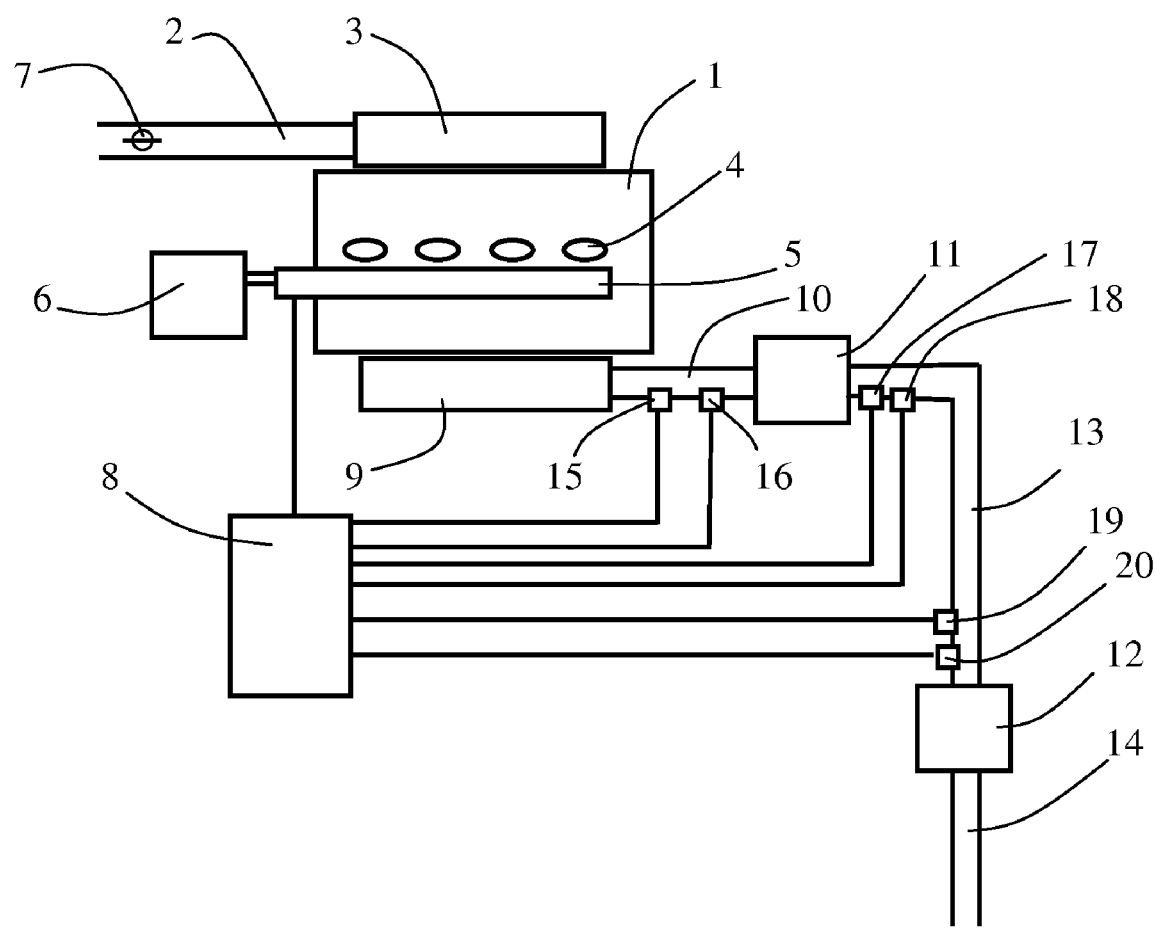
FIG. 1 is a schematic view of a diesel engine system according to the present invention.

FIG. 1 shows a schematic view of an arrangement according to the present invention. According to a preferred embodiment, the invention is arranged in connection with a diesel engine 1 suitable for use in a vehicle (not shown). In a conventional manner, the engine 1 is supplied with inflowing air via an air conduit 2 which is connected to an air intake 3. Furthermore, the engine 1 is provided with a number of cylinders 4 and a fuel injection arrangement 5 arranged for feeding fuel from a fuel tank 6 to each one of the cylinders 4. Also, the air conduit 2 is provided with a throttle 7 in a conventional manner.

The fuel injection arrangement 5 comprises fuel injectors (not shown in detail) which are connected to a central control unit 8. The control unit 8 is adapted to control the fuel supply to the fuel injection arrangement 5 in a manner which is generally known, so that a suitably adapted air/fuel mixture is fed to the engine 1. This means that a correct amount of fuel to the engine 1 can be supplied individually to each cylinder 4 during operation of the engine 1, in particular so that the air/fuel mixture to the engine 1 is adapted to the prevailing operating condition of the engine 1 in every given moment.

The control of the engine 1 occurs in an essentially known manner depending on various parameters which reflect the operating condition of the engine 1 and the vehicle in question. For example, the engine 1 can be controlled depending on the prevailing position of the throttle 7, the engine speed, the amount of injected air to the engine and the oxygen concentration in the exhaust gases. This engine management process is known as such, and for this reason it is not described in detail here.

The exhaust gases from the engine 1 are guided out from the cylinders 4 via an exhaust outlet 9 and further to an exhaust pipe 10 which is connected to the exhaust outlet 9. Further downstream of the exhaust pipe 10, a LNT 11 is provided. The LNT 11 is of a type previously known as such, and is consequently adapted for adsorbing the $NO_x$ compounds which are flowing out from the engine 1 via the exhaust pipe 10.

Furthermore, a particulate matter filter 12 is arranged downstream of the LNT 11. The particulate matter filter 12 and the LNT 11 are connected via a second exhaust pipe 13. According to the embodiment shown in FIG. 1, the particulate matter filter 12 and the LNT 11 are in the form of two separate units. According to an alternative embodiment (not shown), these two units can also be combined into one single, integrated component.

In a manner which is previously known, the particulate matter filter 12 is arranged for trapping particulate matter (primarily in the form of soot) being emitted via the exhaust gas. Preferably, the particulate matter filter 12 is also provided with catalytic capacity for oxidizing, i.e. removing, hydrocarbon compounds (HC) and carbon monoxide (CO) in the exhaust gas. The exhaust gases flow out from the engine 1, through the LNT 11 and the particulate matter filter 12 and further out to the atmosphere via a third exhaust pipe 14.

The arrangement shown in FIG. 1 is provided with a number of sensors which are used in connection with the invention. Accordingly, a first temperature sensor 15 and a first lambda sensor 16 are arranged in the first exhaust pipe 10. A second temperature sensor 17 and a second lambda sensor 18 are arranged in the second exhaust pipe 13. Furthermore, a $NO_x$ sensor 19 and a pressure sensor 20 are preferably arranged in the second exhaust pipe 13. All these sensors 15, 16, 17, 18, 19, 20 are connected to the control unit 8, so that the control unit 8 may store data which indicates values being measured by said sensors 15, 16, 17, 18, 19, 20.

More precisely, the purpose of the first temperature sensor 15 is to provide a signal indicating the exhaust gas temperature upstream of the LNT 11, and to feed said signal to the control unit 8 so as to control the temperature of said LNT 11. The purpose of the first lambda sensor 16 is to provide a signal indicating the exhaust gas oxygen content upstream of the LNT 11, and to feed said signal to the control unit 8 so as to maintain a desired air/fuel ratio depending on a given operating condition of the engine 1.

The purpose of the second temperature sensor 17 is to provide a signal indicating the exhaust gas temperature upstream of the particulate matter filter 12, and to feed said signal to the control unit 8 so as to control the temperature of said particulate matter filter 12. The purpose of the second lambda sensor 18 is to provide a signal indicating the exhaust gas oxygen content upstream of the particulate matter filter 12, and to feed said signal to the control unit 8 so as to maintain a desired air/fuel ratio depending on a given operating condition of the engine 1.

Furthermore, the purpose of the $NO_x$ sensor 19 is to provide an indication of the $NO_x$ content in the exhaust gas flowing out from the LNT 11, in order to provide a diagnosis of said LNT 11. Finally, the purpose of the pressure sensor 20 is to provide a signal indicating the pressure upstream of the particulate matter filter 12. As will be explained below, the pressure signal is used for determining whether a regeneration of the particulate matter filter 12 is necessary. It should be noted here that the sensors 17-20 may be in the form of physical sensor components, or may alternatively be in the form of "virtual" sensors, i.e. providing values which are modelled from other sensors.

Although not shown in FIG. 1, the diesel engine 1 as described above may alternatively be provided with a turbo system. In such case, the incoming air is supercharged, i.e. compressed, by means of a compressor, which in turn is operated by means of an exhaust gas turbine. The operation of a turbo system is previously known as such and for this reason it is not described in detail here.

During operation of the engine 1, the $NO_x$ compounds in the exhaust gases from the engine 1 will be adsorbed by the LNT 11, and particulate matter in the exhaust gases will be trapped in the particulate matter filter 12. However, as mentioned initially, sulfur in the exhaust gas will be gradually accumulated in the LNT 11. For this reason, there is a need for a regular de-sulfurisation, or sulfur regeneration process, for the LNT 11. According to prior art, such a de-sulfurisation can be carried out by operating the engine 1 so that a rich exhaust gas mixture is provided and by providing an increased exhaust gas temperature, at least approximately 600-650° C., during a short time period. Also, the particulate matter filter must be regularly regenerated, i.e. accumulated soot and other particles must be combusted. Such a process demands a lean exhaust gas mixture and a relatively high temperature, at least approximately 580° C.

As mentioned above, the present invention is adapted so as to combine the de-sulfurisation process of the LNT 11 and the regeneration process of the particulate matter filter 12 in an optimum manner. Such a process will now be described in detail with reference to FIG. 2, which is a graph showing a part of a "pulsed" switching between a rich and a lean exhaust gas mixture of the engine 1 in a periodical manner according to the invention.

Figure 2:
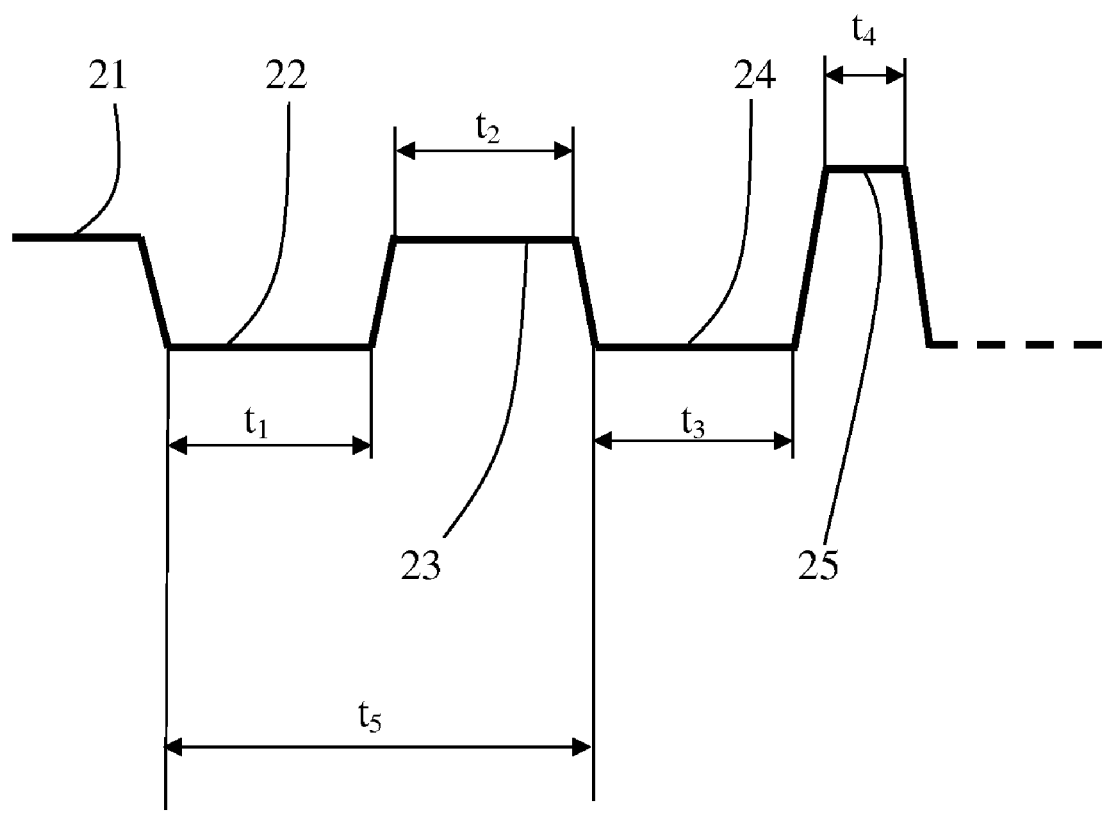
FIG. 2 is a diagram showing a pulsed operation between lean and rich operating modes, in accordance with the invention.

FIG. 2 shows several consecutive phases which occur during operation of the engine 1. Firstly, it can be noted that a continuous phase is present, as indicated by means of reference numeral 21. This phase 21 corresponds to "normal" operation of the vehicle in which the engine 1 is used, i.e. an operating condition which for example corresponds to a relatively low load of the engine 1 during normal driving with the vehicle. In such case, it can be expected that the exhaust gas mixture has an air/fuel ratio λ which is approximately 2. On the other hand, in case of a relatively high load of the engine 1 the air/fuel ratio would be approximately 1.2-1.5 in most cases.

At a given point in time, it is determined that the LNT 11 and the particulate matter filter 12 (cf. FIG. 1) need to be regenerated. In normal applications, the time interval between two consecutive regeneration occasions is controlled by the time interval which is necessary for regeneration of the particulate matter filter 12. This is due to the fact that the particulate matter filter 12 is "filled" with particles in a shorter time than the LNT 12 is "filled" with sulfur (provided that low sulphur concentration fuel is used).

A starting point for the regeneration process is preferably determined by detecting the differential pressure Δp over the particulate matter filter 12. The differential pressure Δp corresponds to the difference between the pressure as measured by the pressure sensor 20 (see FIG. 1) and the atmospheric pressure on the downstream side of the particulate matter filter 12, i.e. the pressure in the third exhaust pipe 14. As the particulate matter filter 12 starts to accumulate particles, the back pressure will gradually increase. This means that when the differential pressure Δp has reached a predetermined maximum limit value, which is stored in the control unit 8, a regeneration of both the particulate matter filter 12 and the LNT 11 should be initiated. It should be noted that the invention is not limited to this type of initiation only. According to an alternative, for example, a diagnosis of the efficiency of the LNT 12 can be used for initiating said regeneration process, i.e. when said efficiency is lower than a given threshold value.

The regeneration process according to the invention starts with the control unit 8 setting the operation of the engine 1 so that the temperature of the exhaust gases is increased to a target temperature, i.e. in order to provide a sufficient amount of heat for the de-sulfurisation process of the LNT 11. In normal applications, the exhaust gas temperature needs to be approximately 600-650° C. In this regard, the exhaust temperature is controlled by measuring the temperature upstream of the LNT 11 by means of the first temperature sensor 15.

After the heating phase, the engine 1 is adapted so that a relatively rich exhaust gas mixture is provided. This corresponds to a de-sulfurisation phase, which is indicated by reference numeral 22 in FIG. 2, in which the air/fuel ratio λ of the exhaust gas is switched to a rich value which is sufficiently low so as to provide an effective de-sulfurisation. In normal cases, the air/fuel ratio λ during the de-sulfurisation phase 22 can be for example of the magnitude 0.85-0.95, but the invention is not limited to any particular air/fuel ratio value. This rich mode of operation is maintained during a first time period $t_1$. Consequently, the increased temperature of the exhaust gases during de-sulfurisation phase 22 together with the rich exhaust gas is sufficient for the de-sulfurisation process. In normal applications, the first time period $t_1$ is approximately 4-8 seconds, but other time periods are obviously also possible, for example depending on the prevailing operating conditions of the engine 1.

The additional amount of heat which is necessary during the de-sulfurisation phase 22 is preferably provided by means of post-injections of fuel into the engine 1. Post injections are defined as fuel injected so late in the combustion cycle that when it burns, it is converted into heat in the exhaust rather than torque. Alternatively, it may not burn at all in the cylinder, but instead burn over a catalytic surface. According to an alternative embodiment, the additional heat can be provided by throttling the engine, which will decrease the amount of oxygen that is guided into the cylinders. According to a further embodiment, a combination of throttling and post-injection of fuel is used.

Preferably, the control unit 8 may be adapted so as to control certain conditions before switching to the de-sulfurisation phase 22 is carried out. For example, the switch may only be allowed if the engine 1 is operated with a load in which rich operation is feasible, if the exhaust gas temperature is within a predetermined interval, and if the status of the vehicle in other ways allows such a de-sulfurisation phase 22.

As mentioned initially, it is important that no $H_2S$ is allowed to be emitted from the LNT 11 during the de-sulfurisation process. In order to avoid a release of such emissions, the time period $t_1$ is limited to a predetermined maximum value $t_{1max}$. Consequently, by keeping the first time period $t_1$ below the maximum value $t_{1max}$, there will be no emissions of $H_2S$ from the LNT 11 forming part of the engine arrangement. More precisely, the control unit 8 contains data regarding a suitable maximum value $t_{1max}$, which is predetermined in the sense that it is based on experimental measurements which apply to a particular configuration involving a particular engine 1 in which the invention is used, and also involving a particular type of LNT 11 etc. In summary, the control unit 8 is preferably adapted so as to terminate the rich mode of operation when the maximum value $t_{1max}$ has been reached.

After the de-sulfurisation phase 22, i.e. after the above-mentioned first time period $t_1$, the operation of the engine 1 is again changed. This time the engine 1 is adjusted so as to provide a lean exhaust gas mixture. This corresponds to a second phase, a regeneration phase, which is indicated by means of reference numeral 23 in FIG. 2 and which lasts during a second time period $t_2$. The purpose of the regeneration phase 23 is to provide an environment with a surplus of oxygen which is necessary to regenerate the particulate matter filter 12 by combusting particles accumulated in said filter 12. This is accomplished by providing an exhaust gas mixture with a lean air/fuel ratio which also has a sufficiently high temperature for said regeneration. Suitably, the temperature is at least approximately 580° C. Due to the fact that in normal particulate matter filters, certain parts thereof (for example, parts close to the periphery) will be naturally more cool than other parts, it is advantageous if the exhaust temperature exceeds the limit value of 580° C. with a certain margin. As described above, this demand is guaranteed since the preceding heating phase generates a temperature of at least 600-650° C. In this regard, it should also be noted that the temperature upstream of the particulate matter filter 12 can be detected by means of the second temperature sensor 17.

Also, as will be discussed in detail below, the control unit 8 is preferably arranged so that the value of the first time period $t_1$ and the value of the second time period $t_2$ are logged and stored in the control unit 8.

In normal applications involving an engine 1 of the diesel type which is used in a conventional car, it can be expected that the maximum accumulation of soot in the particulate matter filter is approximately 6-8 grams of particles per liter of the filter. At such amounts of accumulated particles, the filter needs to be regenerated.

In general terms, the air/fuel ratio λ is determined generally by the requested state of operation of the engine and vehicle in question, in particular by the prevailing load of the engine 1. For example, and in most situations, a relatively high load corresponds to a relatively low air/fuel ratio, whereas a relatively low load corresponds to a relatively high air/fuel ratio. As previously known per se, the control unit 8 is adapted for detecting data from various sensors (i.e. indicating engine speed, degree of throttling, engine temperature, air/fuel ratio of the exhaust gas etc.) and for adapting the fuel delivery to the engine 1 depending on such data. In this manner, the air/fuel ratio of the exhaust gas will be adapted to the prevailing operating condition.

As an example, it can be assumed that the air/fuel ratio λ during the regeneration phase 23 is for example the same as during the continuous phase 21, i.e. approximately 2 (which corresponds to a relatively low load of the engine). Such an air/fuel ratio λ corresponds to a particular oxygen concentration in the exhaust gas. Also, as mentioned initially, there is a risk for irreversible damage to the particulate matter filter 12 in case of high soot loading and excess oxygen during the regeneration. Such a situation may result in a very high temperature in the particulate matter filter, which may lead to uncontrolled combustion, which in turn causes damage such as substrate cracking or melting. For this reason, the present invention is arranged so that the flow of oxygen through the particulate matter filter 12 is limited to a particular maximum value during regeneration of the particulate matter filter 12. Preferably, the invention is based on the principle that the average flow of oxygen per time unit, during the de-sulfurisation phase 22 and the regeneration phase 23, must be limited to a maximum value. If this value should be exceeded, there is a risk for damage to the particulate matter filter 12.

Consequently, the control unit 8 is arranged so as to terminate the regeneration phase 23 after a limited second time period $t_2$. In this regard, it should be noted that the actual air/fuel ratio during the regeneration phase 23 depends on the load of the engine 1. This means in particular that the second time period $t_2$ will be limited to a maximum value $t_{2max}$, in order not to exceed the above-mentioned predetermined maximum value of the average flow of oxygen per time unit.

The invention is based on a "pulsating" switching between a first mode of operation and a second mode of operation, wherein the first mode of operation corresponds to de-sulfurisation of the LNT 11 with a rich exhaust gas mixture and the second mode of operation corresponds to a regeneration of the particulate matter filter 12 with a lean exhaust gas mixture. The first time period $t_1$ during which the de-sulfurisation occurs is limited to a maximum value $t_{1max}$ so as to avoid formation and emissions of $H_2S$, and the second time period $t_2$ during which the regeneration occurs is limited to a further maximum value $t_{2max}$ so as to limit the average flow of oxygen per time unit to a maximum value, in order to avoid crackdown of the particulate matter filter. One full cycle with a de-sulfurisation phase 22 and a regeneration phase 23 corresponds to a cycle time period $t_5$, as indicated in FIG. 2.

The control unit 8 is adapted for controlling the switching between the rich and lean operating modes with smooth transitions between said modes. This is indicated in FIG. 2 by means of the ramps between said modes. In this manner, the transitions between the rich and lean modes can be obtained with good driveability of the vehicle in question and transitions which are unnoticeable to the occupants of the vehicle.

After a full cycle, i.e. after the time period $t_5$, the sequence with a "pulsating" switching between rich and lean periods is repeated until it is determined that the LNT 11 and the particulate matter filter 12 have been regenerated to a satisfactory degree. In normal applications, it can be expected that the above-mentioned rich and lean periods will be repeated during a time period of approximately 10 minutes in order to fully regenerate the LNT 11 and particulate matter filter 12.

As described in FIG. 2, the regeneration process is consequently continued by a second de-sulfurisation phase 24, which is carried out during a third time period $t_3$ with a rich exhaust gas mixture. The second de-sulfurisation phase 24 is followed by a second regeneration phase 25 carried out with a lean exhaust gas during a fourth time period $t_4$. By way of example, the second regeneration phase 25 is assumed to be carried out during an operating condition of the engine 1 which requires an even more lean exhaust gas mixture than during the first regeneration phase 23. The actual air/fuel ratio is determined by the control unit 8 depending on certain operating conditions of the engine, and as indicated in FIG. 2, the second regeneration phase 25 can for example correspond to an air/fuel ratio λ which is of the magnitude 2.5, as compared with an air/fuel ratio λ of 2 during the first regeneration phase 23. This corresponds to a higher flow of oxygen per time unit during the second regeneration phase 25 than during the first regeneration phase 23. In order to keep the average oxygen flow of oxygen per time unit (during the second de-sulfurisation phase 24 and the second regeneration phase 25) below its maximum value, the fourth time period $t_4$ will be shorter than the second time period $t_2$. In other words, the second lean pulse 25 is terminated quicker than the first lean pulse 23.

As mentioned above, the switching between the de-sulfurisation and regeneration phases is repeated until the LNT 11 and the particulate matter filter 12 are regenerated. This is preferably determined by measuring the differential pressure Δp over the particulate matter filter 12 and comparing with a particular value which corresponds to a regenerated filter 12. In other words, when the differential pressure Δp has reached such a limit value, which is stored in the control unit 8, the regeneration can be terminated.

Preferably, a final period of limited oxygen concentration, for example 20-30 seconds, finalizes the de-sulfurisation and regeneration procedure. The reason for this is that if the final de-sulfurisation and regeneration time is spent in a rich mode before returning to normal operation, there is a risk of a large exotherm in the LNT 11. The combination of rich operation, large post-injection amounts, followed by a sharp increase in the oxygen content can otherwise result in a large exotherm which can damage the LNT 11.

As mentioned above, the control unit 8 is preferably arranged so that the value of the first time period $t_1$ and the value of the second time period $t_2$ are logged and stored in the control unit 8. Also, the lengths of all subsequent time periods for the rich and lean phases are also stored and accumulated. In this manner, the control unit 8 will store an accumulated value of the sum of the rich time periods, i.e. $\Sigma t_1+t_3+\ldots$, and an accumulated value of the sum of the lean time periods, i.e. $\Sigma t_2+t_4+\ldots$, which means that an alternative way to determine if the de-sulfurisation and regeneration should be terminated is by checking whether the accumulated values have reached certain limit values.

Furthermore, if for some reason, the de-sulfurisation and/or regeneration process must be terminated before they are complete, the accumulated values can be used for controlling the rich and lean phases during a subsequent de-sulfurisation and/or regeneration process. For example, if the accumulated lean time, i.e. $\Sigma t_2+t_4+\ldots$, has reached the predetermined target value (corresponding to a complete regeneration of the particulate matter filter 12) but the accumulated rich time, i.e. $\Sigma t_1+t_3+\ldots$, has not reached its predetermined target value (corresponding to a complete de-sulfurisation of the LNT 11), the de-sulfurisation will not be complete. Such a situation may arise due to extreme driving or certain ambient conditions. The lacking rich time is then preferably be added to the next subsequent de-sulfurisation phase. For example, if the preset target value for the accumulated rich time is set to 80 seconds, and only 70 seconds of rich time is accumulated, the total rich time during the next de-sulfurisation phase should be 90 seconds.

In normal applications involving for example diesel engines used in cars, it can be expected that the above-mentioned process for de-sulfurisation and regeneration can be repeated with an interval of approximately 300-600 km. However, the invention is not limited to any particular interval.

The present invention is not limited to the above-mentioned embodiment, but can be varied within the scope of the appended claims. For example, the invention is suitable for all engines which are provided with a LNT and a particulate matter filter, for example diesel engine and gasoline engines arranged for lean operation (DI engines) and requiring a LNT and a particulate matter filter. Also, the invention can be implemented without all of the above-mentioned sensors. For example, the $NO_x$ sensor 19 can be replaced with algorithms for calculating expected values indicating the $NO_x$ level in the exhaust gas.

Also, the invention can be implemented on engines with or without turbo systems.

The invention claimed is:

1. A method for purifying exhaust gas in an internal combustion engine having an LNT coupled to an exhaust gas conduit downstream of the engine, and a particulate matter filter coupled to the exhaust gas conduit downstream of the LNT, comprising:
   in a single process regenerating the particulate matter filter and de-sulfurizing the LNT via fluctuation of exhaust air/fuel ratio between a lean operation period and a rich operation period; and
   shortening a period of lean operation as the lean air/fuel ratio increases, where the rich operation de-sulphates the LNT and the lean operation period regenerates the particulate matter filter.

2. The method of claim 1, wherein the adjusting includes shortening the lean operation period as the level of the lean exhaust air/fuel ratio increases.

3. The method of claim 2 further comprising adjusting the level of the lean exhaust air/fuel ratio in response to a requested state of operation of the engine.

4. The method of claim 2 further comprising adjusting the level of the lean exhaust air/fuel ratio to decrease as engine load increases.

5. The method of claim 2 further comprising adjusting the rich operation period.

6. A method for purifying exhaust gas in an internal combustion engine having an LNT coupled to an exhaust gas conduit downstream of the engine, and a particulate matter filter coupled to the exhaust gas conduit downstream of the LNT, comprising:

increasing engine exhaust temperature sufficient to de-sulphate the LNT and to regenerate the particulate matter filter in a single process when a predetermined operating condition is met;

operating the engine with a rich air/fuel ratio for a first predetermined time period to de-sulphate the LNT;

subsequently operating the engine with a lean air/fuel ratio for a second predetermined time period to regenerate the particulate matter filter, where the second predetermined time period becomes shorter as the lean air/fuel ratio increases; and repeating said de-sulphasion and regeneration in a periodic manner at the increased engine exhaust temperature.

7. The method according to claim 6, wherein said first predetermined time period is adjusted based on engine operating conditions so as to avoid formation and emissions of $H_2S$.

8. The method according to claim 7, wherein said second predetermined time period is adjusted based on operating conditions to avoid thermal damage to the particulate matter filter.

9. The method according to any claim 8, wherein said predetermined operating condition is met when differential pressure over the particulate matter filter exceeds a first predetermined threshold value.

10. The method according to claim 9, wherein said repeated de-sulphasion and regeneration is terminated if said differential pressure is lower than a second predetermined threshold value.

11. A method for purifying exhaust gas in an internal combustion engine having an LNT coupled downstream of the engine, and a particulate matter filter coupled downstream of the LNT, comprising:

de-sulphating the LNT and regenerating the particulate matter filter in a single process and at an increased engine exhaust temperature;

during the de-sulphasion and regeneration, repeatedly operating the engine exhaust rich for a first phase and lean for a second phase, where the lean exhaust air/fuel ratio is generated by operating the engine with a lean air/fuel ratio;

increasing the lean air/fuel ratio as engine load decreases; and shortening a period of the second phase as the lean air/fuel ratio increases.

12. The method of claim 11 wherein during the de-sulphasion and regeneration, operation switches between the first interval of lean exhaust and the second interval of rich exhaust, the method further comprising adjusting a period of the rich air/fuel ratio.

13. The method of claim 12 wherein the de-sulphasion and regeneration is ended with a final interval of limited oxygen concentration.

14. A method for purifying exhaust gas in an internal combustion engine having an LNT coupled downstream of the engine, and a particulate matter filter coupled downstream of the LNT, comprising:

de-sulphating the LNT and regenerating the particulate matter filter in a single process and at an increased engine exhaust temperature;

during the de-sulphasion and regeneration, repeatedly operating the engine exhaust rich for a first phase and lean for a second phase, and adjusting a period of the rich air/fuel ratio, where the lean exhaust air/fuel ratio is generated by operating the engine with a lean air/fuel ratio;

increasing the lean air/fuel ratio as engine load decreases;

shortening a period of the second phase as the lean air/fuel ratio increases;

accumulating periods of the first phases; and terminating the de-sulphasion and regeneration based on whether the accumulated first phase period has reached a threshold value;

wherein the de-sulphasion and regeneration is ended with a final interval of limited oxygen concentration.

15. A method for purifying exhaust gas in an internal combustion engine having an LNT coupled downstream of the engine, and a particulate matter filter coupled downstream of the LNT, comprising:

de-sulphating the LNT and regenerating the particulate matter filter in a single process and at an increased engine exhaust temperature;

during the de-sulphasion and regeneration, repeatedly operating the engine exhaust rich for a first phase and lean for a second phase, and adjusting a period of the rich air/fuel ratio, where the lean exhaust air/fuel ratio is generated by operating the engine with a lean air/fuel ratio;

increasing the lean air/fuel ratio as engine load decreases;

shortening a period of the second phase as the lean air/fuel ratio increases;

accumulating periods of the second phases; and terminating the de-sulphasion and regeneration based on whether the accumulated second phase period has reached a threshold value;

wherein the de-sulphasion and regeneration is ended with a final interval of limited oxygen concentration.

16. A system for purifying exhaust gas in an internal combustion engine, comprising:

an LNT and a particulate matter filter arranged in series in an exhaust gas conduit of the engine; and a control unit for controlling the operation of the engine, wherein said control unit is arranged for initiating a heating phase wherein the engine is set to generate heat sufficient for said de-sulphasion of said LNT and regeneration of said particulate matter filter, said control unit initiating an LNT de-sulphasion phase during a first time period, in which the engine is set to generate a rich exhaust gas in said exhaust gas conduit, wherein said first time period is kept below a first maximum value so as to avoid release of emissions of $H_2S$ from said engine, said control unit subsequently initiating a particulate matter filter regeneration phase during a second time period, in which the engine is set to generate a lean exhaust gas in said exhaust gas conduit, wherein said second time period is kept below a second maximum value to avoid thermal damage to said particulate matter filter; and repeating de-sulphasion phase and said regeneration phase in a periodical manner, where the control unit shortens the second time period when increasing an air/fuel ratio of the lean exhaust gas.

* * * * *